United States Patent [19]

Schumacher

[11] Patent Number: 4,515,380
[45] Date of Patent: May 7, 1985

[54] VEHICLE WITH TWO STEERABLE WHEELS

[75] Inventor: Karl Schumacher, Tübingen, Fed. Rep. of Germany

[73] Assignee: Ernst Wagner KG-Fördertechnik, Fed. Rep. of Germany

[21] Appl. No.: 506,346

[22] Filed: Jun. 21, 1983

[30] Foreign Application Priority Data

Jun. 22, 1982 [DE] Fed. Rep. of Germany ....... 3223196

[51] Int. Cl.³ ............................................. B62D 7/08
[52] U.S. Cl. ..................................... 280/93; 74/409; 280/95 R
[58] Field of Search ............... 280/93, 94, 95 R, 95 A, 280/96, 98; 74/409, 440

[56] References Cited

U.S. PATENT DOCUMENTS 3,059,944 10/1962 Goodacre .......................... 280/95 R
3,365,973 1/1968 Hendren ................................ 74/409
3,877,652 4/1975 Bernau ................................ 74/409 X

FOREIGN PATENT DOCUMENTS 79184 5/1983 European Pat. Off. .............. 74/409
1197816 6/1959 France .................................... 280/93
131967 9/1919 United Kingdom ............. 280/95 R
815376 4/1981 United Kingdom ................. 74/409

Primary Examiner—Joseph F. Peters, Jr.
Assistant Examiner—Mitchell J. Hill
Attorney, Agent, or Firm—McGlew and Tuttle

[57] ABSTRACT

To obtain unequal angles of turn for two-steerable wheels of a vehicle inexpensively, each wheel is turned through a gear. The two gears have a center to center distance corresponding to the track of the steerable wheels and are dimensioned to accommodate therebetween a meshing pinion mounted eccentrically on a swing arm. While driving one or each of the gears by means of a steering drive element in the same direction of rotation, the positive engagement of the two gears through the pinion and the eccentric mounting of the pinion on the swing arm produce a larger angle of turn of the wheel running inside the turn as compared to the angle of turn of the wheel running at the outside of the turn. To also ensure a steady, flutter-free straight run of the steerable wheels the swing arm end remote from the pinion is adjustable by a selected amount. In addition, the pinion is designed as a duo-pinion comprising two superposed partial pinions adjustable under the resilient force of at least one interposed torsion spring to reduce the tooth space of the entire duo-pinion. Due to this provision, always at least one tooth of one of the gears is in play-free engagement with the duo-pinion.

7 Claims, 4 Drawing Figures

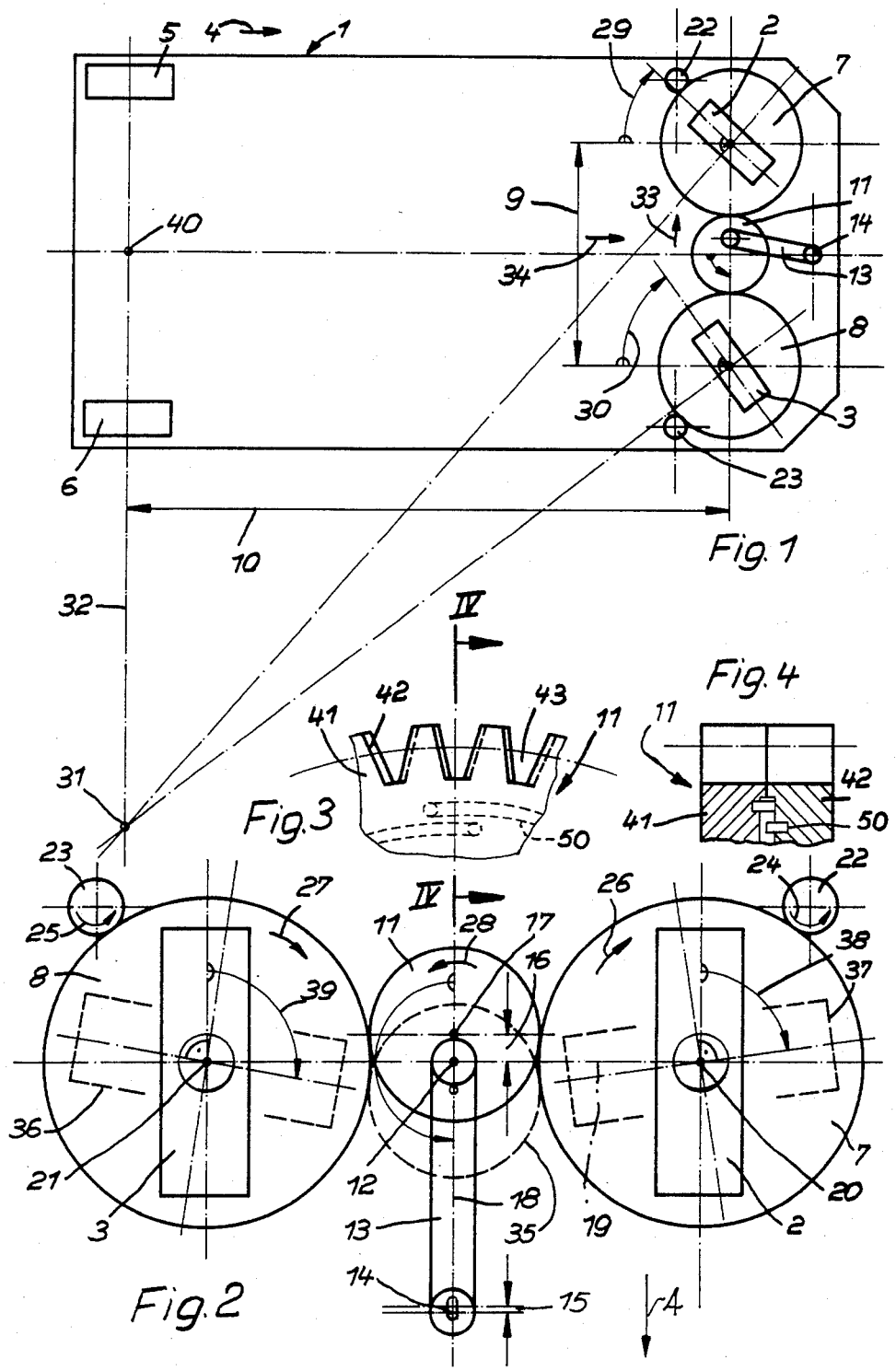

VEHICLE WITH TWO STEERABLE WHEELS

FIELD AND BACKGROUND OF THE INVENTION

The present invention relates in general to a vehicle having a pair of steerable wheels each rotatably mounted on a gear which itself is rotatably mounted on a substantially vertical axis to the vehicle. The gears of each steerable wheel are spaced from each other and an eccentrically mounted pinion is engaged between the gears.

Such vehicles are known in a great variety of designs. In industrial trucks or the like, it may be required to ensure an angle turn in excess of 90° to be able to turn the vehicle virtually on the spot. Such a requirement may, of course, turn up even with other vehicles.

With conventional means, such as levers and linkages, a large angle of steering lock or turn is obtainable only at considerable expense and only inaccurately as a rule. In this connection, it must be understood that two steerable wheels are in parallel position only when running straight ahead. In all other positions they are not parallel to each other. The steering lock of the wheel on the inside of a turn is greater than that on the outside wheel, since the turning radius of the outside wheel about the instantaneous center of rotation, is larger.

SUMMARY OF THE INVENTION

According to the present invention, to be able to negotiate sharp curves or make sharp turns very accurately, and turn on the spot, if needed, each steerable wheel is associated with a gear which is rotatable about a vertical axis passing through the center of the wheel, and a pinion meshing with both the gears is provided therebetween and mounted eccentrically on a swing arm. With the steerable wheels running straight ahead, the longitudinal axis of the swing arm extends in the same direction and passes through the axis of rotation of the pinion, while the pivotal axis of the swing arm on the pinion extends in a vertical plane passing through the axes of rotation of both the gears. Further, at least one of the gears is operatively connected to a steering drive.

A completely satisfactory engagement between each gear and the pinion is obtained and any undesirable play between the teeth is eliminated by providing that the pinion is embodied by a so-called duo-pinion, namely an assembly of two superposed "partial" pinions which are resiliently adjusted or adjustable by turning them relative to each other through a predetermined angle in the direction of rotation of the pinion. In their adjusted, i.e. mutually offset position, the teeth of the two partial pinions so to speak narrow the tooth space to be engaged by the respective teeth of the meshing gear.

Advantageously, the design is such that at least one torsion spring or the like is inserted between the two partial pinions, which spring is biased to increase the mutual displacement of the teeth. Thus, if the respective tooth of the gear engages the adjusted tooth space of the duo-pinion, the partial pinions are resiliently pushed back toward their congruent position, against the action of the torsion spring or springs.

All of these just described measures make sure that the steerable wheels, and thus the entire vehicle, will run particularly smoothly, without obstruction through fluttering of the steerable wheels, or the like.

In a particularly preferred embodiment of the invention, the steering drive element is designed as a pinion meshing with the respective gear, each gear is driven by a pinion of its own, and the two pinions are drivable simultaneously and in the same direction of rotation. It is further provided that the two gears are driven with substantially identical torques. Due to this design, the travel of the vehicle in a straight direction is particularly satisfactory and any unquiet run of the steering wheels in straight forward motion, which would be inevitable with a backlash of the teeth, is avoided. The steerable wheels are, so to speak, firmly clamped under the applied torques and do not tend toward any fluttering during their straight run.

A rather important inventive feature is that the bearing remote from the pinion of the swing arm is slightly adjustable in the direction of straight travel, i.e. perpendicularly to the vertical plane passing through the axes of the two gears. This again contributes to a secure guidance of the vehicle straight ahead, with quiet non-fluttering steering wheels. This adjustment, which may also be automatic, of the swing arm in a position in which its pivotal point on the pinion is spaced from the mentioned vertical plane through the gear axes by the eccentricity of the arm on the pinion, makes sure that at least one tooth of the gears will engage the pinion without play. The play, which otherwise is needed for rotating the pinion during steering, thus being eliminated for a straight ahead travel, the straight run of the steering wheels is guided steadily. The amount by which the swing arm can be adjusted is substantially smaller than the eccentricity of the pinion mounting.

Accordingly, an object of the present invention is to provide a vehicle having steerable wheels mounted on gears, the gears having a pinion engaged therebetween which is eccentrically mounted on a swivel arm, and wherein the pinion is made of two pinion parts each having teeth which are superimposed and wherein the pinion parts are biased together to reduce the size of composite teeth formed by the superimposed pinion part teeth.

Another object of the invention is to provide a steerable vehicle which is simple in design, rugged in construction and economical to manufacture.

The various features of novely which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

One embodiment of the invention is diagrammatically illustrated in the accompanying drawing in which:

FIG. 1 is a bottom plan view of a vehicle having its steering wheels at an angle for making a turn;

FIG. 2 is an enlarged detail of FIG. 1, with the steering wheels in straight-ahead position (solid lines);

FIG. 3 is a partial side view of the pinion; and

FIG. 4 is a sectional view taken along the line IV—IV of FIG. 3.

DESCRIPTION OF THE PREFERRED EMBODIMENT

Referring to the drawings, FIG. 1 shows a vehicle 1 which has a frame with two steerable wheels 2,3, preferably in front, while considering travel in the direction of arrow 4. The two non-steerable idle wheels 5,6 are then in the rear. At least the steerable wheels are mounted on a bearing bracket (not shown) by which also two gears 7, 8 are firmly supported. The swivel axes of gears 7,8 extend substantially perpendicularly to those of the steerable wheels. Further, the axes of rotation of the gears coincide with the respective axes of rotation of the bearing brackets or the like. They are spaced from each other by a distance 9, i.e. the track of the steerable wheels, which is smaller than the track of the other two wheels 5,6. The wheel base is indicated at 10.

With a given wheel base 10, gears 7,8 are provided in a size leaving an intermediate space for a meshing pinion 11 having about half the number of teeth. The pinion is eccentrically mounted on a swing arm 13, for pivoting about an axis 12. The end of swing arm 13 which is remote from the pinion is hinged to the vehicle frame, for pivoting about an arm axis 14. This pivotal point or arm axis 14 is adjustable by a small amount 15. (e.g. in a slot) This amount, as shown, is substantially smaller than the amount of eccentricity 16 by which the other pivotal point 12 of swing arm 13 is spaced from the axis of rotation 17 of pinion 11.

With wheels 2,3 in straight-ahead position (solid lines in FIG. 2), the longitudinal axis 18 of swing arm 13 extends at right angles to a vertical plane 19 which is perpendicular to the drawing plane and passes through the vertical swivel axes 20, 21 of gears 7,8 and through the rotation axes of wheels 2,3. In this position of wheels 2,3 pivotal axis 12 also extends in vertical plane 19. During a forward travel, arm axis 14 of swing arm 13 extends ahead of pivotal axis 12, while axis 17 of pinion 11 extends behind. Gears 7,8 can be rotated separately by means of steering drive pinions 22,23 which are operatively connected to a steering drive motor (not shown), to be rotated in the same direction, for example as shown by arrows 24,25. Each of pinions 22,23 transmits about the same torque to its associated gear 7,8. This serves the purpose of steadying the travel straight ahead in the same way as the adjustment of pivotal point 14 of swing arm 13. Upon turning the two gears 7,8 by means of the drive motor and pinions 22,23 in the direction of arrows 26,27, pinion 11 is rotated in the direction of arrow 28, and wheels 2,3 are turned through a corresponding angle. The sizes and numbers of teeth are such that while turning pinion 11 through 90°, wheels 2,3 turn through about 45°, as indicated at 29,30 in FIG. 1. However, due to the coupling of gears 7,8 through pinion 11 which is eccentrically mounted on swing arm 13, the angle of lock or turn 30 of inner wheel 3 is larger than that 29 of outer wheel 2. The oblique position of the wheels is such that the produced axes of rotation of wheels 2,3 intersect at a point 31 on the extended axis 32 of rear wheels 5,6, forming the instantaneous turning center of vehicle 1. With this 90° rotation of pinion 11, pivotal axis 12 migrates (substantially staying in vertical plane 19) in the direction of arrow 33 (FIG. 1), while pinion 11 itself moves in the direction of arrow 34, forward. Taking the example of a 45° turn of wheels 2,3, pinion 11 arrives at a location exactly between the two gears, in which axis of rotation 17 extends in vertical plane 19. Axis 12 can stay in plane 19 due to the adjustment amount 15.

Upon a 180° turn of pinion 11, the pinion comes into a position indicated by a broken line 35 in FIG. 2 representing a maximum steering angle for the rotation axes of the wheels. Axis 17 of pinion 11 has thus moved ahead through twice the eccentricity and wheels 2,3 are in their positions indicated by broken lines 36,37 in FIG. 2. The positions are somewhat exaggerated, to make the showing clear. It is evident, however, that now the angle of turn 38 is somewhat smaller than 90° while the angle of turn 39 of the other wheel 3 is larger than 90°. Vehicle 1 can then turn about point 40, i.e. on the spot. This is desirable especially with industrial trucks.

The geometrical relations and backlash are to be such as to enable pinion 11 to perform its translational motion in the direction of arrow 34, while taking into account that the track, that is the distance between gears 7 and 8, is given. It follows therefrom that during a travel straight forward, due to the eccentric position of pinion 11 shown in FIG. 2 in a solid line and the necessary backlash, wheels 2,3 may not run quietly. The suitable and successful remedies are an adjustment of pivotable point 14 of swing arm 13, and a design of pinion 11 as a duo-pinion. A duo-pinion comprises partial pinions or pinion parts 41,42 of identical dimensions, which are superimposed and resiliently braced against each other, e.g. by a torsion spring 50 having ends connected to pinion parts 41,42, so that the tooth spaces 43 are narrowed. That is, spring 50 biases parts 41, 42 in a direction to reduce the size of composite tooth spaces 43 defined between composite teeth of the pinion parts as shown in FIG. 3. This effect is obtained by means of one or more torsion springs or other biasing means. Even in a position displaced relative to that shown in FIG. 1, the duo-pinion engages, without play, with at least one tooth of the gears 7,8. This again contributes to a flutter-free run of steerable wheels 2,3.

While a specific embodiment of the invention has been shown and described in detail to illustrate the application of the principles of the invention, it will be understood that the invention may be embodied otherwise without departing from such principles.

What is claimed is:

1. A vehicle for travel in a travel direction, comprising:

a frame;

a pair of gears pivotally mounted to said frame on swivel axes at laterally spaced positions with respect to the travel direction, said gears being spaced from each other transversely to the travel direction;

a pinion having a central axis, meshed with each of said gears and disposed in the space between said gears;

a swing arm pivotally connected to said frame at an arm axis and rotatably connected to said pinion at an eccentric axis with respect to said central axis, said arm axis being forward of said eccentric axis in the travel direction;

a steerable wheel rotatably mounted to each gear about a rotation axis which is at an angle to said swivel axis of each respective gear, said swivel axis of each gear extending through a center of a respective steerable wheel;

said swing arm having a longitudinal axis which extends parallel to the travel direction with said rotation axes of each steerable wheel extending transversely to said travel direction for straight ahead travel of the vehicle, said eccentric axis lying in a plane containing said swivel axes of said gears with said longitudinal axis extending parallel to the travel direction, said central axis of said pinion lying rearward of said eccentric axis and in a common plane with said eccentric axis and said arm axis with said longitudinal axis of said swing arm lying parallel to the travel direction when said rotation axes lie transversely to the travel direction, and said central axis of said pinion lying forward of said eccentric axis and in a common plane with said eccentric axis and said arm axis with said longitudinal axis lying parallel to the travel direction when said rotation axes lie at a maximum steering angle to the travel direction; and drive means engaged with at least one of said gears for rotating said at least one gear to rotate said pair of gears about said swivel axes to steer the vehicle;

said pinion comprising a pair of superimposed pinion parts each having teeth which are superimposed to form composite teeth that are meshed with said gears and form composite tooth spaces, and biasing means connected between said pinion parts for biasing said pinion parts to reduce the size of said composite tooth spaces whereby at least one of said composite teeth firmly meshes with each of said gears at any angular position of said pinion.

2. A vehicle according to claim 1, wherein said biasing means comprises a torsion spring connected between said pinion parts.

3. A vehicle according to claim 1, wherein said drive means comprises at least one steering drive pinion meshed with one of said gears for driving one of said gears to simultaneously drive said pair of gears.

4. A vehicle according to claim 1, wherein said drive means comprises a steering drive pinion meshed with each gear for driving each gear simultaneously with identical torque in the same direction.

5. A vehicle according to claim 1, including adjustment means connected between said arm axis of said swing arm and said frame for permitting movement by a selected amount of said arm axis with respect to said frame in the travel direction.

6. A vehicle according to claim 1, wherein each swivel axis of each gear is substantially perpendicular to a rotation axis of said steerable wheel rotatably mounted to each gear, said swivel axes extending substantially vertically and said rotation axes extending substantially horizontally.

7. A vehicle according to claim 1, wherein a pair of spaced non-steering wheels rotatably mounted to said frame having a spacing in a direction transverse to the travel direction which is greater than a spacing between said steering axes of said pair of gears.

* * * * *